United States Patent
Takata et al.

(10) Patent No.: US 9,287,996 B2
(45) Date of Patent: Mar. 15, 2016

(54) COMMUNICATION SYSTEM, COMMUNICATION DEVICE, POWER SUPPLY DEVICE, AND VEHICLE

(71) Applicants: SUMITOMO ELECTRIC INDUSTRIES, LTD., Osaka-shi, Osaka (JP); SUMITOMO WIRING SYSTEMS, LTD., Mie (JP); AUTONETWORKS TECHNOLOGIES, LTD., Mie (JP)

(72) Inventors: Yousuke Takata, Osaka (JP); Ryou Okada, Osaka (JP); Kazuhiko Nii, Osaka (JP); Takeshi Hagihara, Osaka (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

(*) Notice: Subject to any disclaimer, the term of this patent is extended or adjusted under 35 U.S.C. 154(b) by 0 days.

(21) Appl. No.: 14/381,519
(22) PCT Filed: Feb. 5, 2013
(86) PCT No.: PCT/JP2013/052575
§ 371 (c)(1),
(2) Date: Aug. 27, 2014
(87) PCT Pub. No.: WO2013/129038
PCT Pub. Date: Sep. 6, 2013

(65) Prior Publication Data
US 2015/0023438 A1 Jan. 22, 2015

(30) Foreign Application Priority Data
Feb. 28, 2012 (JP) .................... 2012-042399

(51) Int. Cl.
*H04L 25/00* (2006.01)
*H04B 15/02* (2006.01)
(Continued)

(52) U.S. Cl.
CPC ............ *H04B 15/02* (2013.01); *B60L 11/1818* (2013.01); *B60L 11/1838* (2013.01);
(Continued)

(58) Field of Classification Search
CPC ... H04L 25/0272; H04L 25/0292; B65H 75/48; B65H 75/425; H02G 11/02
USPC ................................ 375/257; 320/109, 165
See application file for complete search history.

(56) References Cited

U.S. PATENT DOCUMENTS 5,596,258 A * 1/1997 Kimura et al. ............... 320/163
6,510,184 B1    1/2003 Okamura
(Continued)

FOREIGN PATENT DOCUMENTS

| JP | 11-145928 A | 5/1999 |
| JP | 3082756 B2 | 8/2000 |

(Continued)

OTHER PUBLICATIONS

International Search Report PCT/JP2013/052575 dated Apr. 2, 2013.
(Continued)

*Primary Examiner* — Khai Tran
(74) *Attorney, Agent, or Firm* — McDermott Will & Emery LLP

(57) ABSTRACT

A communication system, a communication device, a power supply device, and a vehicle are provided, which can suppress occurrence of communication abnormality while suppressing noise applied to a power supply line to be lower than a predetermined upper limit value of a standard, in communication such as inband communication in which a vehicle and a power supply device are connected to each other via a charging cable containing the power supply line and a control line, and a communication signal is transmitted and received using the control line as a medium. A power supply device 2 reads setting relating to an output for each frequency which is previously stored in a memory 221b, and performs a mapping process of adjusting, based on the read setting, an output waveform relating to transmission of the communication signal to an amplitude previously set for each frequency. Then, the power supply device 2 executes inverse fast Fourier transform on the mapped communication signal to convert the communication signal represented as digital data on a frequency domain into digital data on a time domain, and converts the digital signal into analog signal to be transmitted.

7 Claims, 13 Drawing Sheets

(51) Int. Cl.
  *B60L 11/18* (2006.01)
  *H04B 3/54* (2006.01)
(52) U.S. Cl.
  CPC .............. *B60L11/1846* (2013.01); *H04B 3/54* (2013.01); *H04B 3/548* (2013.01); *B60L 2210/30* (2013.01); *B60L 2230/12* (2013.01); *H04B 2203/547* (2013.01); *H04B 2203/5425* (2013.01); *Y02T 10/7005* (2013.01); *Y02T 90/14* (2013.01); *Y02T 90/16* (2013.01)

(56) References Cited

U.S. PATENT DOCUMENTS

2006/0170285 A1  8/2006  Morimitsu et al.
2009/0102433 A1* 4/2009  Kamaga .................. 320/165

FOREIGN PATENT DOCUMENTS

| JP | 2004-165950 A | 6/2004 |
|---|---|---|
| JP | 2004-215038 A | 7/2004 |
| JP | 2007-13812 A | 1/2007 |
| JP | 2008-205873 A | 9/2008 |
| JP | 2011-072104 A | 4/2011 |
| JP | 2011-259658 A | 12/2011 |
| JP | 2012-084273 A | 4/2012 |
| JP | 2012-257127 A | 12/2012 |
| WO | 2011/154815 A2 | 12/2011 |

OTHER PUBLICATIONS

"Surface Vehicle Recommended Practice", J1772 Jan. 2010, Society of Automotive Engineers, Inc., Oct. 1996, revised Jan. 2010, pp. 1-51.

Japanese Office Action dated Nov. 17, 2015 issued in Japanese Patent Application No. 2014-502093 (English translation).

A. Mori, et al., "A Study on Power Line Transmission Characteristics Using High-speed PLC Modem," Institute of Electronics, Information, and Communication Engineers, IEICE Technical Report, pp. 11-17 (English Abstract).

M. Tokuda, "EMC (Electromagnetic Compatibility) for Telecommunications System," The Institute of Electronics, Information and Communication Engineers, Technical Report of IEICE, pp. 27-33 (English Abstract).

* cited by examiner

COMMUNICATION SYSTEM, COMMUNICATION DEVICE, POWER SUPPLY DEVICE, AND VEHICLE

CROSS-REFERENCE TO RELATED APPLICATIONS

This application is the U.S. National Phase of PCT/JP2013/052575 filed Feb. 5, 2013, which claims priority from Japanese Patent Application No. 2012-042399 filed Feb. 28, 2012. The subject matter of each is incorporated herein by reference in entirety.

TECHNICAL FIELD

The present invention relates to a communication system, a communication device, a power supply device, and a vehicle which, when power is supplied using a power supply line, transmit and receive a communication signal different from a control signal required for control of the power supply by means of, as a medium, a control line for transmitting the control signal.

BACKGROUND AND IN PROGRESS ART

In recent years, electric vehicles and hybrid vehicles are beginning to prevail, which include devices such as motors and batteries, and travel by driving the motors with power stored in the batteries. The electric vehicles charge their batteries with power supplied from external power supply devices. As for the hybrid vehicles, plug-in hybrid vehicles have been practically used, which allow their batteries to be charged by external power supply devices. The external power supply devices are power supply devices installed in ordinary houses or facilities such as commercial charging stations. When a power supply device supplies power to a vehicle, a plug at an end of a charging cable connected to the power supply device is connected to a power supply port which is provided in the vehicle as a power receiving connector. Then, power is supplied from the power supply device to the vehicle via a power supply line contained in the charging cable, and thereby the battery is charged.

Not only the power supply line but also other lines such as a grounding line, a control line, and the like are contained in the charging cable. The control line is a line used for transmission of a control signal such as a control pilot signal or the like used for control of power supply to the power storage device. By transmitting and receiving the control signal between the power supply device and the vehicle via the control line, various states are detected such as the connection state of the charging cable, whether charging is possible or not, the state of charging, and the like, and charging control is performed according to the detected states.

Further, for practical use of vehicles that need external power supply, such as electric vehicles and hybrid vehicles, a communication function is required, which allows a vehicle and a power supply device to transmit and receive information for power supply control, and communication information for management of the amount of power, accounting, or the like.

Thus, standardization of communication such as inband communication has been progressed, in which a communication signal is superposed on a control signal to be transmitted and received between a vehicle and a power supply device (refer to Non-Patent Literature 1, for example).

FIG. 9 is an illustrative diagram showing an exemplary configuration of a system standardization of which is in progress. In FIG. 9, reference numeral 1000 denotes a vehicle. When the vehicle 1000 is supplied with power from a power supply device 2000, the vehicle 1000 is connected to the power supply device 2000 via a charging cable 3000. The charging cable 3000 contains a pair of power supply lines 3001 and 3002 used for power supply, a grounding line 3003 which is a conducting wire for grounding, and a control line 3004 for transmitting a control signal such as a control pilot signal (CPLT) used for charging control.

An end of the charging cable 3000 is connected to the power supply device 2000 side, and a plug 3005 is provided on the other end of the charging cable 3000. The plug 3005 is connected to a power receiving connector 1001 provided as a connection part at a power supply port on the vehicle 1000 side, and thereby power supply is enabled.

The power supply device 2000 includes a power supply section 2001 that supplies AC power, a charging control section 2002 that performs communication relating to charging control, a communication section 2003 that transmits and receives a communication signal, and a superposition/separation section 2004 that performs superposition and separation of the communication signal on and from the grounding line 3003 and the control line 3004.

The superposition/separation section 2004 superposes various communication signals on the grounding line 3003 and the control line 3004, and separates superposed various communication signals. When the superposition/separation section 2004 superposes various communication signals output from the communication section 2003, and inputs separated various communication signals to the communication section 2003, the communication section 2003 is allowed to perform communication.

The vehicle 1000 includes the power receiving connector 1001, a battery 1002, a charging device 1003 that charges the battery 1002, a charging control device 1004 that performs communication relating to charging control, a communication device 1005 that transmits and receives communication signals, and a superposition/separation unit 1006 that performs superposition and separation of the communication signals on and from the grounding line 3003 and the control line 3004.

The superposition/separation unit 1006 superposes various communication signals on the grounding line 3003 and the control line 3004, and separates superposed various communication signals. When the superposition/separation unit 1006 superposes various communication signals output from the communication device 1005, and inputs separated various communication signals to the communication device 1005, the communication device 1005 is allowed to perform communication.

However, in the system relating to communication such as inband communication as shown in FIG. 9, if a communication signal transmitted through the control line 3004 crosstalks the power supply lines 3001 and 3002, noise may occur in the power supply lines 3001 and 3002.

An upper limit of voltage of noise caused in the power supply lines 3001 and 3002 due to crosstalk of a communication signal is defined as the CISPR 22 standard by the International Special Committee on Radio Interference. Control such as output suppression for the communication signal is performed so that the voltage value of noise does not exceed the upper limit value defined in the standard over the entire frequency relating to the communication.

CITATION LIST

Non Patent Literature

NON PATENT LITERATURE 1: "SURFACE VEHICLE RECOMMENDED PRACTICE", J1772 January 2010, Society of Automotive Engineers, Inc., October, 1996 (revised in January, 2010)

SUMMARY OF INVENTION

Technical Problem

However, if the output voltage of the communication signal is lowered so that the voltage value of noise does not exceed the upper limit defined in the standard at a frequency at which the noise has a peak, communication abnormality such as reduction in communication speed, communication failure, reduction in signal-to-noise ratio, or the like might occur.

FIG. 10 is a graph showing noise that crosstalks from a communication line to a power supply line. FIG. 10 is a graph showing crosstalk characteristics of noise, in which the horizontal axis shows the frequency (Hz), and the vertical axis shows the logarithm of the voltage value (dBμV) of noise caused by crosstalk of a communication signal. In the graph, a solid line denoted by Q.P. shows the upper limit value defined by the CISPR 22 standard. The upper limit value is defined to be 55 dBμV in a frequency band ranging from 500 kHz to 5 MHz, and 60 dBμV in a frequency band ranging from 5 MHz to 30 MHz.

In FIG. 10, since a frequency at which the peak of noise is closest to the upper limit value defined in the standard is present in a frequency band indicated by A, the output voltage of the communication signal needs to be suppressed so that the peak of noise does not exceed the upper limit value. Accordingly, if the output voltage is adjusted so that the peak of noise does not exceed the upper limit value, the output voltage is suppressed also in a frequency band in which the effect of noise is small and the voltage of noise is sufficiently lower than the standard value, and therefore, the above-mentioned communication abnormality is more likely to occur.

The present invention is made in view of the above situations, and an object of the present invention is to provide a communication system, a communication device, a power supply device, and a vehicle, which can ensure stable communication while observing the standard, by adjusting an output waveform of a communication signal to an amplitude previously set for each frequency.

Solution to Problem

A communication system according to the present invention is a communication system in which a vehicle including a power storage device and a power supply device that supplies power to the power storage device are connected to each other via a power supply line used for power supply and a control line for transmitting a control signal required for control of the power supply using the power supply line, and a communication signal different from the control signal is transmitted and received using the control line as a medium. In the communication system, at least one of the vehicle and the power supply device includes a transmission section that transmits the communication signal, and the transmission section includes adjustment means that adjusts an output waveform relating to the transmission of the communication signal to an amplitude previously set for each frequency.

In the communication system according to the present invention, the transmission section further includes storage means in which setting relating to an output for each frequency is previously stored. The adjustment means adjusts the communication signal by means of data on a frequency domain indicating an amplitude for each frequency, based on the setting for each frequency stored in the storage means, and converts the communication signal as the data on the frequency domain into data on a time domain.

In the communication system according to the present invention, adjustment means is configured to adjust the communication signal by orthogonal frequency-division multiplexing.

In the communication system according to the present invention, the setting of the amplitude for each frequency is determined based on crosstalk characteristics with respect to the power supply line.

A communication device according to the present invention is a communication device which is connectable to a control line for transmitting a control signal required for control of power supply using a power supply line, and transmits a communication signal different from the control signal by using the control line as a medium. The communication device includes means that adjusts an output waveform relating to the transmission of the communication signal to an amplitude previously set for each frequency.

A power supply device according to the present invention is a power supply device which is connectable to an external object to be supplied with power, via a power supply line used for power supply and a control line for transmitting a control signal required for control of the power supply using the power supply line, and transmits a communication signal different from the control signal by using the control line as a medium. The power supply device includes means that adjusts an output waveform relating to transmission of the communication signal to an amplitude previously set for each frequency.

A vehicle according to the present invention is a vehicle which includes a power storage device, is connectable to an external power supply device that supplies power to the power storage device, via a power supply line used for power supply and a control line for transmitting a control signal required for control of the power supply using the power supply line, and further includes a communication device that transmits a communication signal different from the control signal by using the control line as a medium. The communication device includes means that adjusts an output waveform relating to transmission of the communication signal to an amplitude previously set for each frequency.

In the present invention, by setting an output waveform of a communication signal for each frequency, it is possible to adjust the output waveform so that an output in a frequency band where crosstalk that occurs on the power supply line due to the communication signal has a peak is suppressed, and simultaneously, an output in a frequency band where influence of the crosstalk is small is not suppressed more than necessary.

Advantageous Effects of Invention

A communication system, a communication device, a power supply device, and a vehicle according to the present invention are capable of setting an output for each frequency so that an output in a frequency band where crosstalk that occurs on a power supply line due to a communication signal has a peak is suppressed, and simultaneously, an output in a frequency band where influence of the crosstalk is small is not suppressed more than necessary. Accordingly, advantageous effects are achieved, such as preventing occurrence of communication abnormality due to the output of the communication signal being reduced more than necessary, while suppressing crosstalk on the power supply line with the CISPR22 standard or the like being observed.

DESCRIPTION OF EMBODIMENTS

Figure 1:
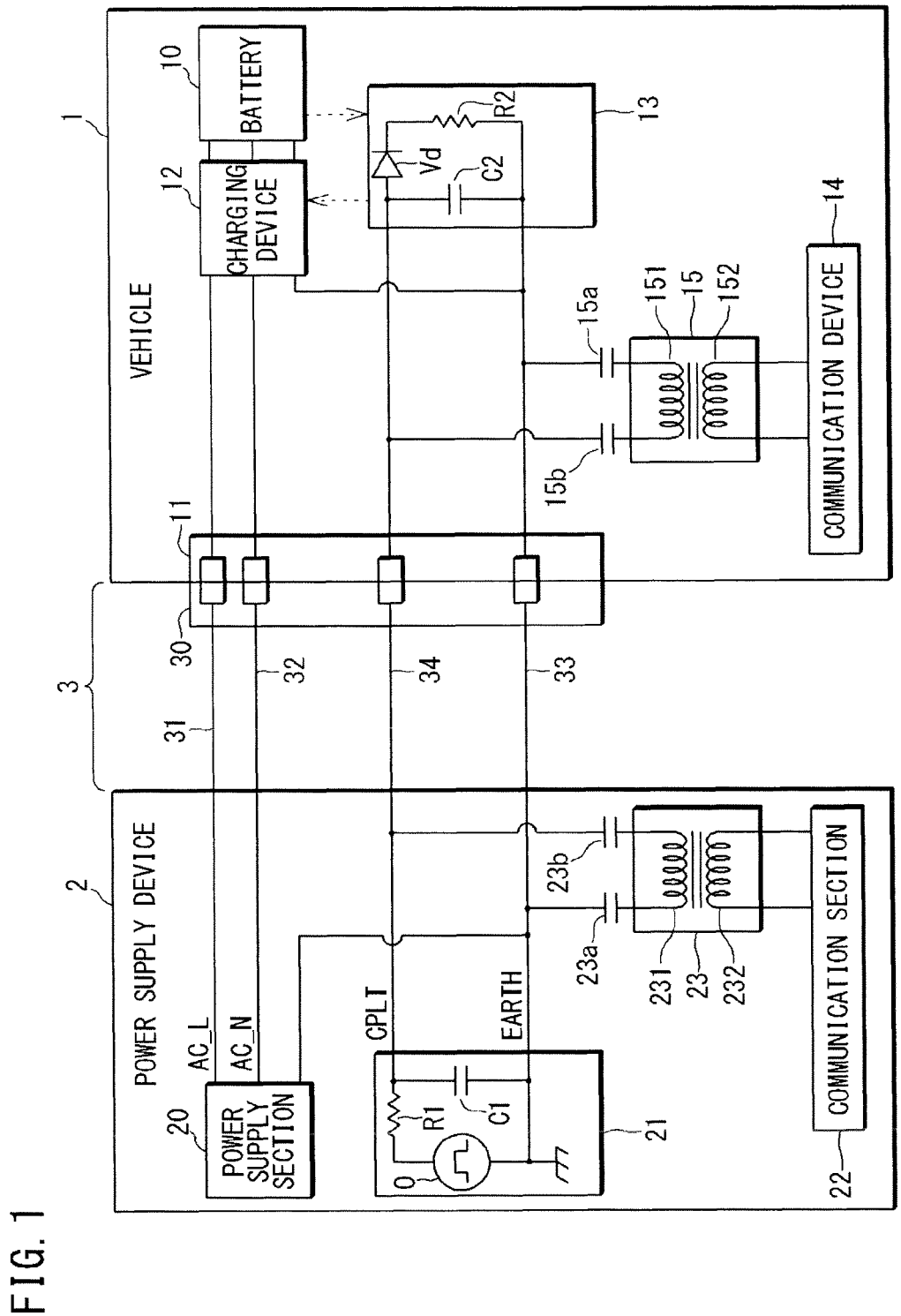
FIG. 1 is an illustrative diagram showing an exemplary configuration of a communication system according to the present invention.

Hereinafter, the present invention will be described in detail with reference to the drawings showing embodiments thereof. FIG. 1 is an illustrative diagram showing an exemplary configuration of a communication system according to the present invention. FIG. 1 shows an example in which the communication system of the present invention is applied to a case in which a battery (power storage device) 10 included in a vehicle 1 such as an electric vehicle, plug-in hybrid vehicle, or the like is supplied with power from a power supply device 2 such as a charging stand or the like.

The vehicle 1 and the power supply device 2 can be connected to each other by a charging cable 3. The charging cable 3 contains a pair of power supply lines 31 and 32 used for power supply, a grounding line 33 as a conducting wire for grounding, and a control line 34 that transmits a control signal such as a control pilot signal (CPLT) used for charging control. An end of the charging cable 3 is connected to the power supply device 2 side, and a plug 30 is provided on the other end of the charging cable 3. The plug 30 can be connected to a power receiving connector 11 provided as an in-vehicle power supply port serving as a connection site on the vehicle 1 side. When the plug 30 at the other end of the charging cable 3 is connected to the power receiving connector 11, connection terminals provided at end portions of the power supply lines 31 and 32, the grounding line 33, and the control line 34 in the charging cable 3 come into contact with connection terminals provided in the power receiving connector 11, whereby the circuit structure exemplarily shown in FIG. 1 is realized.

The power supply lines 31 and 32 are AC lines to which AC voltage is applied. The control line 34 is a signal line through which a control signal such as a control pilot signal is transmitted and received, and charging control is performed based on a control pilot signal transmitted and received when the power supply device 2 and a charging control device 13 are connected to each other. In addition, the grounding line 33 and the control line 34 can be used as media for transmitting information for performing management such as vehicle authentication, charging management, accounting management, or the like, and other various kinds of information. That is, the vehicle 1 and the power supply device 2 can communicate with each other by superposing and separating a communication signal on and from the grounding line 33 and the control line 34.

The power supply device 2 includes a power supply section 20 that supplies AC power, a charging control section 21 that performs communication relating to charging control, a communication section 22 that transmits and receives a communication signal, and a superposition/separation section 23 that superposes and separates a communication signal on and from the grounding line 33 and the control line 34.

One ends of the power supply lines 31 and 32 and the grounding line 33 are connected to the power supply section 20. One end of the control line 34 and the grounding line 33 are connected to the charging control section 21. Lines inside the power supply device 2 are internal conducting lines that act as extended lines connected to the power supply lines 31 and 32, the grounding line 33, and the control line 34 which are contained in the charging cable 3 provided outside the power supply device 2. However, in the following description, for convenience sake, the lines inside the power supply device 2, including the extended line portions provided as the internal conducting lines, will be described as the power supply lines 31 and 32, the grounding line 33, and the control line 34.

The charging control section 21 is, for example, an output-side circuit complying with the international standard relating to charging control, and performs charging control in various states such as confirmation of connection, start of energization, and the like by transmitting and receiving a control signal such as a control pilot signal.

The charging control section 21 includes various elements such as a capacitor C1, a resistor R1, and the like, and various circuits such as an oscillation circuit O and the like. The parameters of the various elements such as the capacitor C1 and the resistor R1 are appropriately designed in view of the frequency band of the control signal to be transmitted and received, and the like. For example, when a control pilot signal having a rectangular wave of 1 kHz is used as a control signal, a capacitor C1 of 2.2 nF and a resistor R1 of 1.0 kΩ are used.

The superposition/separation section 23 is connected to a branch line branched from the grounding line 33 and to a branch line branched from the control line 34 via coupling capacitors 23a and 23b, respectively. For example, a capacitor having a capacitance of 1 nF is used as each of the coupling capacitors 23a and 23b.

The superposition/separation section 23 is a circuit such as a coupling transformer (an electromagnetic guidance type signal converter) including a primary coil 231 having both ends connected to the grounding line 33 and the control line 32 via the respective branch lines, and a secondary coil 232 electromagnetically coupled to the primary coil 231. The secondary coil 232 is connected to the communication section 22.

The superposition/separation section 23 superposes various communication signals on the grounding line 33 and the control line 34, and separates superposed various communication signals. When the superposition/separation section 23 superposes various communication signals output from the communication section 22, and inputs separated various communication signals to the communication section 22, the communication section 22 is allowed to perform communication.

Each communication signal is transmitted and received as an electric signal superposed on carriers (subcarriers). The communication signal is an OFDM signal composed of a plurality of subcarriers. As for the frequency bands used for the carriers relating to the communication signal, a frequency band ranging from several 10 kHz to several 100 kHz, e.g., from 30 kHz to 450 kHz, is used for low-speed communication, and a frequency band ranging from several MHz to several 10 MHz, e.g., from 2 MHz to 30 MHz, is used for high-speed communication. Since the control signal is output from an oscillator of 1 kHz, the control signal is a signal of a lower frequency than the communication signal.

The vehicle 1 includes, in addition to the battery 10 and the power receiving connector 11, a charging device 12 that charges the battery 10, the charging control device 13 that performs communication relating to charging control, a communication device 14 that transmits and receives a communication signal, and a superposition/separation unit 15 that superposes and separates a communication signal on and from the grounding line 33 and the control line 34.

When the plug 30 of the charging cable 3 is connected to the power receiving connector 11 of the vehicle 1, connection terminals provided at the other ends of the power supply lines 31 and 32, the other end of the grounding line 33, and the other end of the control line 34, which are contained in the charging cable 3, are connected to the connection terminals provided in the power receiving connector 11.

In the power receiving connector 11, internal lines connected to the power supply lines 31 and 32, the grounding line 33, and the control line 34 via the connection terminals are provided. The other ends of the internal lines connected to the power supply lines 31 and 32 are connected to the charging device 12 via AC lines provided inside the vehicle 1, whereby the battery 10 is charged by the charging device 12. The other end of the internal line connected to the grounding line 33 is connected to the charging device 12, the charging control device 13, and the battery 10 via an internal line in the vehicle 1 or a body earth. The other end of the internal line connected to the control line 34 is connected to the charging control device 13 via an extended line provided as an internal line in the vehicle 1. In the following description, for convenience sake, the respective internal lines, including the AC lines and the extended lines, will be described as the power supply lines 31 and 32, the grounding line 33, and the control line 34, in cases where it is not necessary to distinguish them.

The charging control device 13 is, for example, an input-side circuit complying with the international standard relating to charging control, and performs charging control in various states such as confirmation of connection, start of energization, and the like, by transmitting and receiving a control signal such as a control pilot signal, when the charging control device 13 becomes communicable with the charging control section 21 of the power supply device 2.

The charging control device 13 includes various elements such as a capacitor C2, a resistor R2, a diode Vd, and the like. The parameters of the various elements such as the capacitor C2 and the resistor R2 are appropriately designed in view of the frequency band relating to the control signal to be transmitted and received, or the like. For example, when a control pilot signal having a rectangular wave of 1 kHz is used as a control signal, a capacitor C2 of 1.8 nF and a resistor R2 of 2.74 kΩ are used.

The superposition/separation unit 15 is connected to a branch line branched from the grounding line 33 and to a branch line branched from the control line 34 via coupling capacitors 15a and 15b, respectively. For example, a capacitor having a capacitance of 1 nF is used as each of the coupling capacitors 15a and 15b.

The superposition/separation unit 15 is a circuit such as a coupling transformer including a primary coil 151 having both ends connected to the grounding line 33 and the control line 32 via the respective branch lines, and a secondary coil 152 electromagnetically coupled to the primary coil 151. The secondary coil 152 is connected to the communication device 14.

The superposition/separation unit 15 superposes various communication signals on the grounding line 33 and the control line 34, and separates superposed various communication signals. When the superposition/separation unit 15 superposes various communication signals output from the communication device 14, and inputs separated various communication signals to the communication device 14, the communication device 14 is allowed to perform communication.

That is, a loop circuit for transmitting a communication signal is formed by the superposition/separation unit 15, the grounding line 33, the control line 34, the superposition/separation section 23, and other lines, elements, and circuits. Thereby, inband communication in which a communication signal is superposed on the grounding line 33 and the control line 34 is realized between the communication device 14 in the vehicle 1 and the communication section 22 in the power supply device 2.

Figure 2:
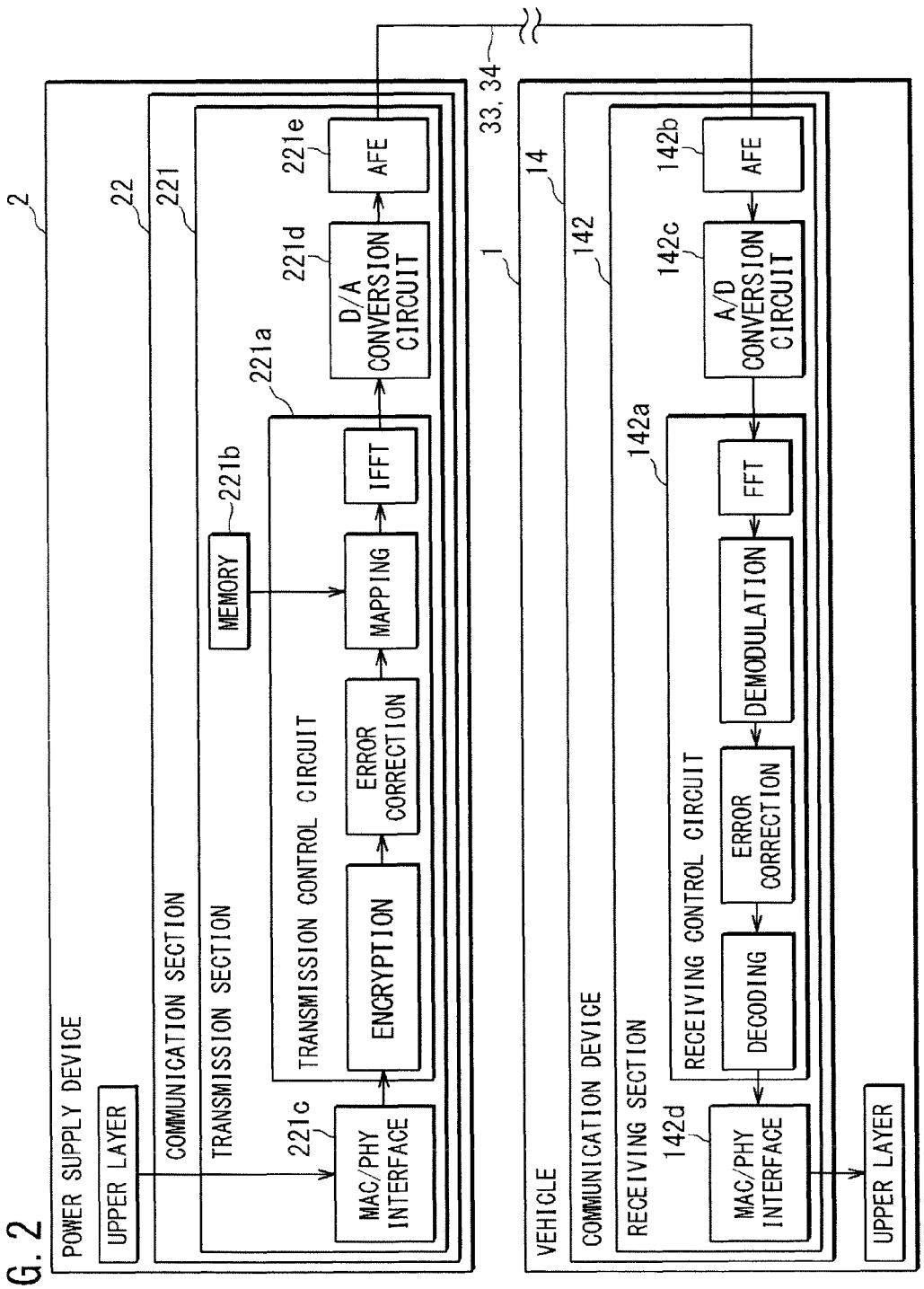
FIG. 2 is a functional block diagram showing an exemplary configuration of the communication system according to the present invention in a case where a communication signal is transmitted from a communication section of a power supply device to a communication device of a vehicle.

Next, the communication device 14 included in the vehicle 1 and the communication section 22 included in the power supply device 2 will be described. First, a case where a communication signal is transmitted from the communication section 22 of the power supply device 2 to the communication device 14 of the vehicle 1 will be described. FIG. 2 is a functional block diagram showing an exemplary configuration of the communication system according to the present invention in the case where a communication signal is transmitted from the communication section 22 of the power supply device 2 to the communication device 14 of the vehicle 1.

The communication section 22 of the power supply device 2 includes a transmission section 221 that transmits a communication signal as an electromagnetic wave superposed on carriers. The transmission section 221 includes various circuits such as a transmission control circuit 221a, a memory 221b, a MAC/PHY interface 221c, a D/A conversion circuit 221d, an AFE (Analog Front End) 221e, and the like.

The transmission section 221 receives, by the MAC/PHY interface 221c, a communication signal to be transmitted, as digital data from an upper layer, and transfers the received communication signal to the transmission control circuit 221a. The upper layer indicates the configuration of equipment, circuitry, software, and the like that generate the communication signal to be transmitted, and conceptually indicates the configuration of upper hardware and software relating to communication, such as a data link layer.

The transmission control circuit 221a is a circuit such as a processor that performs various processes on the communication signal as digital data. The transmission control circuit 221a performs an encryption process on the communication signal received as digital data. Any encryption process may be performed as long as it is an encryption algorithm for digital data. Then, an error correction process is performed on the encrypted digital data. The error correction process is a process for enabling the receiver end to perform a detection/correction process for errors such as bit errors, and for example, is a process of adding codes such as parity bits used for a process such as parity check.

Further, the transmission control circuit 221a reads setting relating to an output for each frequency, which is previously stored in the memory 221b. The memory 221b is configured by using a storage device such as a flash memory, and stores therein setting relating to an output for each frequency with respect to a communication signal, for example, a value indicating an amplitude of an output voltage for each frequency, an amplification factor, and the like. The setting relating to the output for each frequency is determined based on influence of an electromagnetic wave leaking from the grounding line 33 and the control line 34 on the power supply lines 31 and 32, that is, based on crosstalk to the power supply lines 31 and 32. For example, the output is reduced in a frequency band where the crosstalk is large, whereas the output is increased in a frequency band where the crosstalk is small.

The transmission control circuit 221a performs a mapping process to adjust the communication signal, based on the setting relating to the output for each frequency, which has been read from the memory 221b. The mapping indicates conversion of, for example, the amplitude of an output voltage per frequency of the communication signal into data on a complex plane corresponding to a frequency domain. In the mapping process, modification of subcarriers is performed for data modification, and the amplitudes of the subcarriers are adjusted based on the setting relating to the output for each frequency, which is stored in the memory 221b.

The transmission control circuit 221a executes an inverse fast Fourier transform (IFFT) process on the communication signal mapped on the complex plane corresponding to the frequency domain, thereby converting the communication signal represented as digital data on the frequency domain into digital data on a time domain.

Then, the transmission control circuit 221a transfers the communication signal converted into digital data on the time domain to the D/A conversion circuit 221d. The D/A conversion circuit 221d converts the communication signal as digital data into analog data, and transfers the communication signal to the AFE 221e. The AFE 221e outputs the communication signal received as analog data to the outside of the communication device 14. The communication signal output from the communication device 14 is transmitted to the vehicle 1 through the superposition/separation section 23, the grounding line 33, and the control line 34.

As described above, the transmission section 221 of the communication section 22 performs a transmission process in which the transmission control circuit 221a adjusts the setting of the amplitude for each frequency, relating to the communication signal, based on the setting relating to the output for each frequency, which is previously stored in the memory 221b, and then executes inverse fast Fourier transform on the communication signal, and thereafter, the communication signal is output.

That is, the transmission control circuit 221a performing the mapping process acts as adjustment means for adjusting the amplitude for each frequency.

The communication device 14 of the vehicle 1 includes a receiving section 142 that receives the communication signal. The receiving section 142 includes various circuits such as a receiving control circuit 142a, an AFE 142b, an A/D conversion circuit 142c, a MAC/PHY interface 142d, and the like.

The receiving section 142 receives, via the superposition/separation unit 15, an input of the communication signal transmitted through the grounding line 33 and the control line 34, and transfers the received communication signal as analog data to the AFE 142b. The AFE 142b transfers the communication signal to the A/D conversion circuit 142c.

The A/D conversion circuit 142c converts the received communication signal as analog data into digital data, and transfers the communication signal to the receiving control circuit 142a.

The receiving control circuit 142a is a circuit such as a processor that performs various processes on the communication signal as digital data. The receiving control circuit 142a divides the communication signal into, for example, frames each having a predetermined frame length to recognize the communication signal as digital data on a time domain, and executes a fast Fourier transform (FFT) process on the communication signal as digital data on the time domain to convert the communication signal into digital data on a frequency domain.

The receiving control circuit 142a demodulates the communication signal converted into digital data on the frequency domain, and performs an error correction process on the demodulated communication signal. The error correction process is a process of performing, on the communication signal as digital data, detection and correction of errors such as bit errors, and for example, is a process such as parity check to be performed based on the codes such as parity bits which have been added at the transmitter end. Further, the receiving control circuit 142a decodes the communication signal after subjected to the error detection and correction. Then, the receiving control circuit 142a transfers the decoded communication signal to the MAC/PHY interface 142d.

The MAC/PHY interface 142d transfers the received communication signal to an upper layer. The upper layer indicates the configuration of equipment, circuitry, software, and the like that processes the received communication signal, and conceptually indicates the configuration of upper hardware and software relating to communication, such as a data link layer. For example, the upper layer conceptually indicates an in-vehicle communication network based on a standard such as CAN, hardware of equipment such as an ECU connected to the in-vehicle communication network, and software such as an in-vehicle control program to be executed by the ECU.

As described above, as a method of adjusting an output waveform relating to transmission of a communication signal to an amplitude previously set for each frequency, for example, orthogonal frequency-division multiplexing (OFDM) is adopted in which a communication signal is superposed on a plurality of carriers (subcarriers) being orthogonal to one another. In the orthogonal frequency-division multiplexing, an OFDM signal as a communication signal is composed of a plurality of subcarriers. Therefore, by adjusting the amplitude for each subcarrier, the amplitude can be adjusted for each frequency. By using the orthogonal frequency-division multiplexing, it is possible to output a communication signal having an ideal waveform that effectively prevents crosstalk. Any method other than the orthogonal frequency-division multiplexing may be used as long as the amplitude can be adjusted for each frequency. For example, a communication signal may be divided into signals corresponding to different frequency bands by using a bandpass filter, and an amplification process may be performed by using an analog amplifier circuit, based on setting relating to an output for each frequency.

Figure 3:
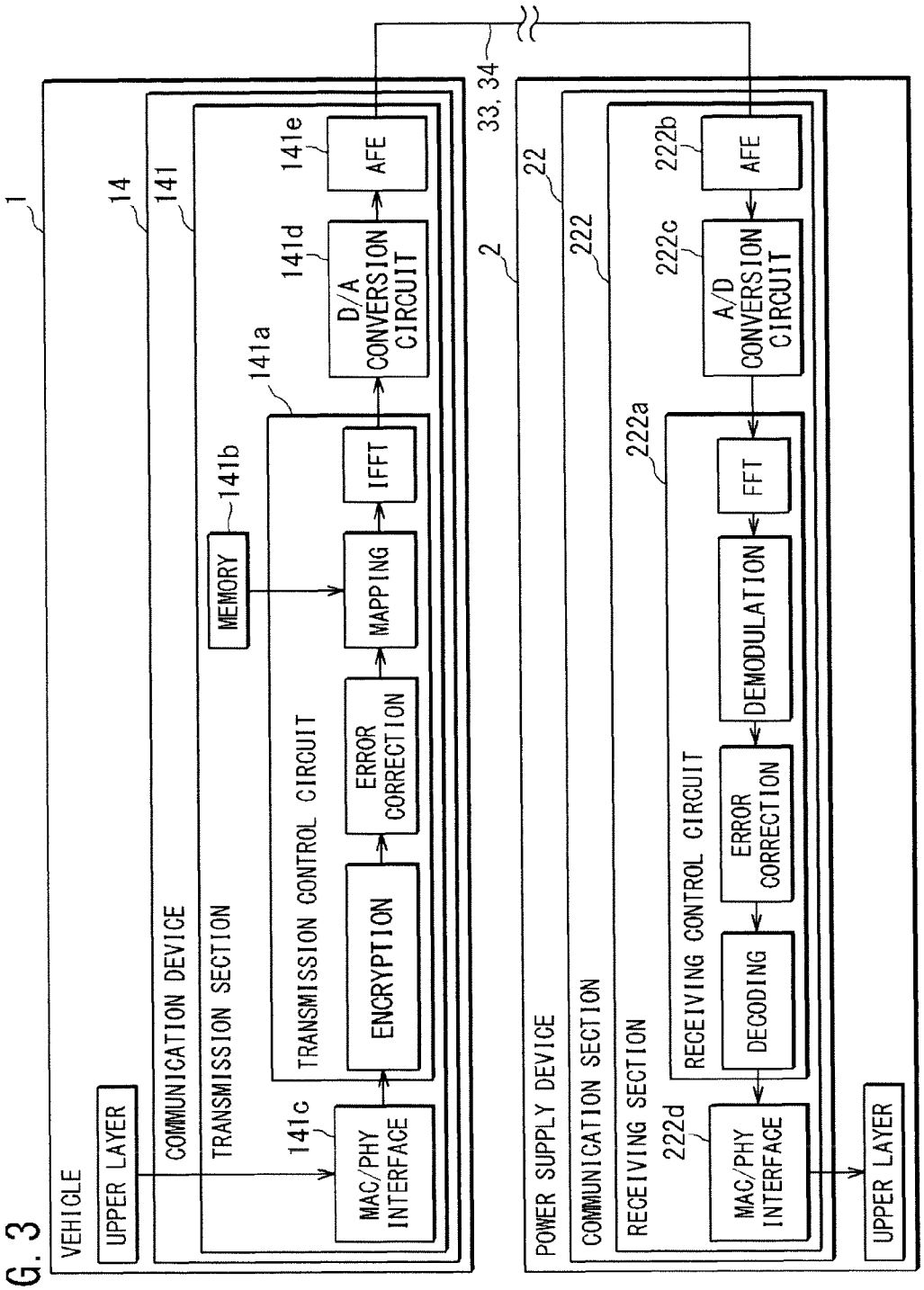
FIG. 3 is a functional block diagram showing an exemplary configuration of the communication system according to the present invention in a case where a communication signal is transmitted from the communication device of the vehicle to the communication section of the power supply device.

Next, a case where a communication signal is transmitted from the communication device 14 of the vehicle 1 to the communication section 22 of the power supply device 2 will be described. FIG. 3 is a functional block diagram showing an exemplary configuration of the communication system according to the present invention in a case where a communication signal is transmitted from the communication device 14 of the vehicle 1 to the communication section 22 of the power supply device 2.

The communication device 14 of the vehicle 1 includes a transmission section 141 that transmits a communication signal as an electromagnetic wave superposed on carriers. The transmission section 141 includes various circuits such as a transmission control circuit 141a, a memory 141b, an MAC/PHY interface 141c, a D/A conversion circuit 141d, an AFE 141e, and the like. Since the functions of these circuits are identical to those of the circuits having the same names in the transmission section 221 of the power supply device 2 described with reference to FIG. 2, repeated description is not necessary.

The transmission control circuit 141a performing a mapping process acts as adjustment means of adjusting the amplitude for each frequency.

The communication section 22 of the power supply device 2 includes a receiving section 222 that receives the communication signal. The receiving section 222 includes various circuits such as a receiving control circuit 222a, an AFE 222b, an A/D conversion circuit 222c, a MAC/PHY interface 222d, and the like. Since the functions of these circuits are identical to those of the circuits having the same names in the receiving section 142 of the vehicle 1 described with reference to FIG. 2, repeated description is not necessary.

Figure 4:
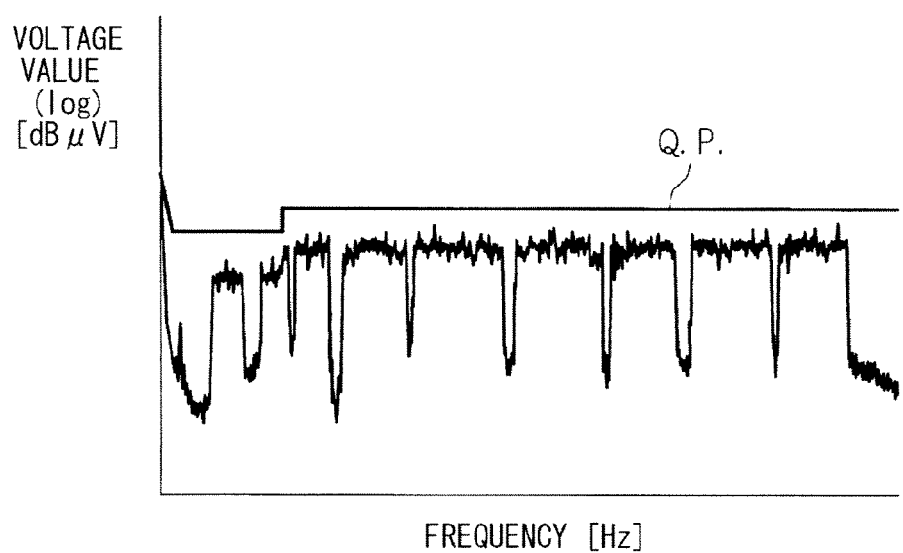
FIG. 4 is a graph showing an experimental example of noise that crosstalks from a communication line to a power supply line in a case where the communication system of the present invention is applied.
Figure 5:
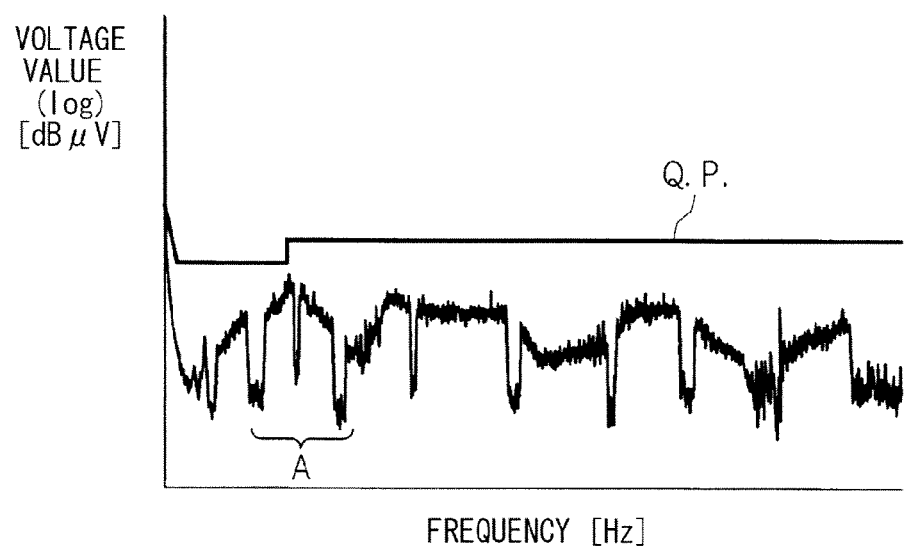
FIG. 5 is a graph showing an experimental example of noise that crosstalks from a communication line to a power supply line in a case where the communication system of the present invention is not applied.

Next, an experimental result in a case where the communication system of the present invention is applied will be described. FIG. 4 is a graph showing an experimental example of noise that crosstalks from a communication line to a power supply line in the case where the communication system of the present invention is applied. FIG. 5 is a graph showing an experimental result of noise that crosstalks from a communication line to a power supply line in a case where the communication system of the present invention is not applied. FIG. 5 is used for comparison with the communication system of the present invention. Each of FIGS. 4 and 5 is a graph showing crosstalk characteristics of noise, in which the horizontal axis shows the frequency (Hz), and the vertical axis shows the logarithm of the voltage value (dBμV) of noise caused by crosstalk of the communication signal. In the graph, a solid line denoted by Q.P. indicates an upper limit value defined by the CISPR 22 standard. The upper limit value is defined to be 55 dBμV in a frequency band ranging from 500 kHz to 5 MHz, and 60 dBμV in a frequency band ranging from 5 MHz to 30 MHz. In the experimental examples shown in FIGS. 4 and 5, the communication line corresponds to the grounding line 33 and the control line 34 described with reference to FIG. 1, and the power supply line corresponds to the power supply lines 31 and 32.

As shown in FIG. 5, when the present invention is not applied, a frequency at which a peak of noise is closest to the upper limit value of the standard is present in a frequency band denoted by A. Accordingly, the output voltage of the communication signal needs to be suppressed so that the peak of noise in the frequency band A does not exceed the upper limit value. However, since there is a great difference between the peak of noise in the frequency band A and the voltage ratios in other frequency bands, if the output voltage is adjusted so that the peak of noise does not exceed the upper limit value, the output voltage is suppressed also in the frequency bands in which the effect of noise is small and the voltage of noise is sufficiently lower than the standard value.

In contrast, as shown in FIG. 4, when the present invention is applied, the peak of noise can be adjusted to the same level over the entire frequency band. Thereby, the difference between the peak of noise closest to the upper limit value of the standard and the voltage ratios in other frequency bands is reduced. Therefore, even when the output voltage is adjusted so that the peak of noise does not exceed the upper limit value of the standard, it is possible to sufficiently increase the output voltage. Accordingly, it is possible to reduce, at the receiver end, the possibility of occurrence of communication abnormality such as reduction in the communication speed, communication failure, reduction in the signal-to-noise ratio, and the like which are caused by the signal relating to the communication information being faint. That is, in the present invention, it is possible to achieve an advantageous effect that occurrence of communication abnormality can be suppressed while suppressing crosstalk to the power supply lines 31 and 32 with the communication standard being observed.

The above-mentioned embodiment is merely a disclosure of part of infinite number of examples of the present invention, and can be appropriately designed by adding various factors such as the purpose, usage, mode, and the like. For example, in the above-mentioned embodiment, the communication section is connected to the branch lines branched from the control line and the grounding line via the superposition/separation unit or the superposition/separation section. However, the superposition/separation unit or the like may be interposed in the control line or the like, and the communication device or the like may be connected to the interposed superposition/separation unit or the like.

Figure 6:
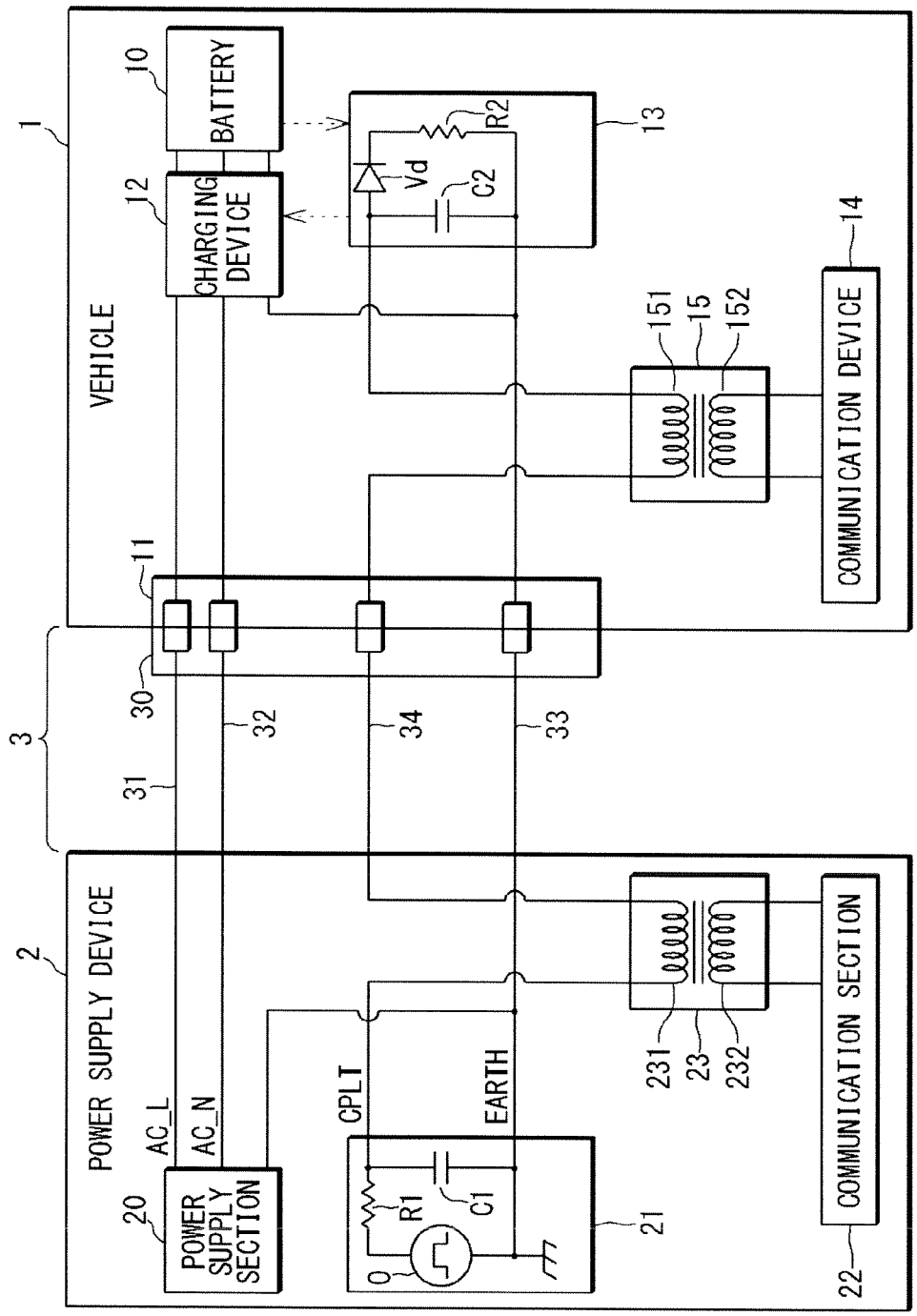
FIG. 6 is an illustrative diagram showing an exemplary configuration of a communication system according to the present invention.

FIG. 6 is an illustrative diagram showing an exemplary configuration of the communication system according to the present invention. FIG. 6 shows another exemplary configuration of the communication system of the present invention described with reference to FIG. 1. In FIG. 6, since the same components as those shown in FIG. 1 are denoted by the same reference numerals as those shown in FIG. 1, the description for FIG. 1 should be referred to for those components. The exemplary configuration shown in FIG. 6 is different from the exemplary configuration shown in FIG. 1 in that the superposition/separation unit 15 or the superposition/separation section 23 is interposed in the control line 34. In the vehicle 1, the superposition/separation unit 15 is interposed in the control line 34, and the both ends of the primary coil 151 of the superposition/separation unit 15 are connected to the control line 34. The both ends of the secondary coil 152 of the superposition/separation unit 15 are connected to the communication device 14. In the power supply device 2, the superposition/separation section 23 is interposed in the control line 34, and the both ends of the primary coil 231 of the superposition/separation section 23 are connected to the control line 34. The both ends of the secondary coil 232 of the superposition/separation section 23 are connected to the communication section 22. As shown in FIG. 6, even when the superposition/separation unit 15 or the like is interposed in the control line 23 and connected to the communication device 14 or the like, the same effect can be achieved by adjusting the amplitude for each frequency as described above.

Figure 7:
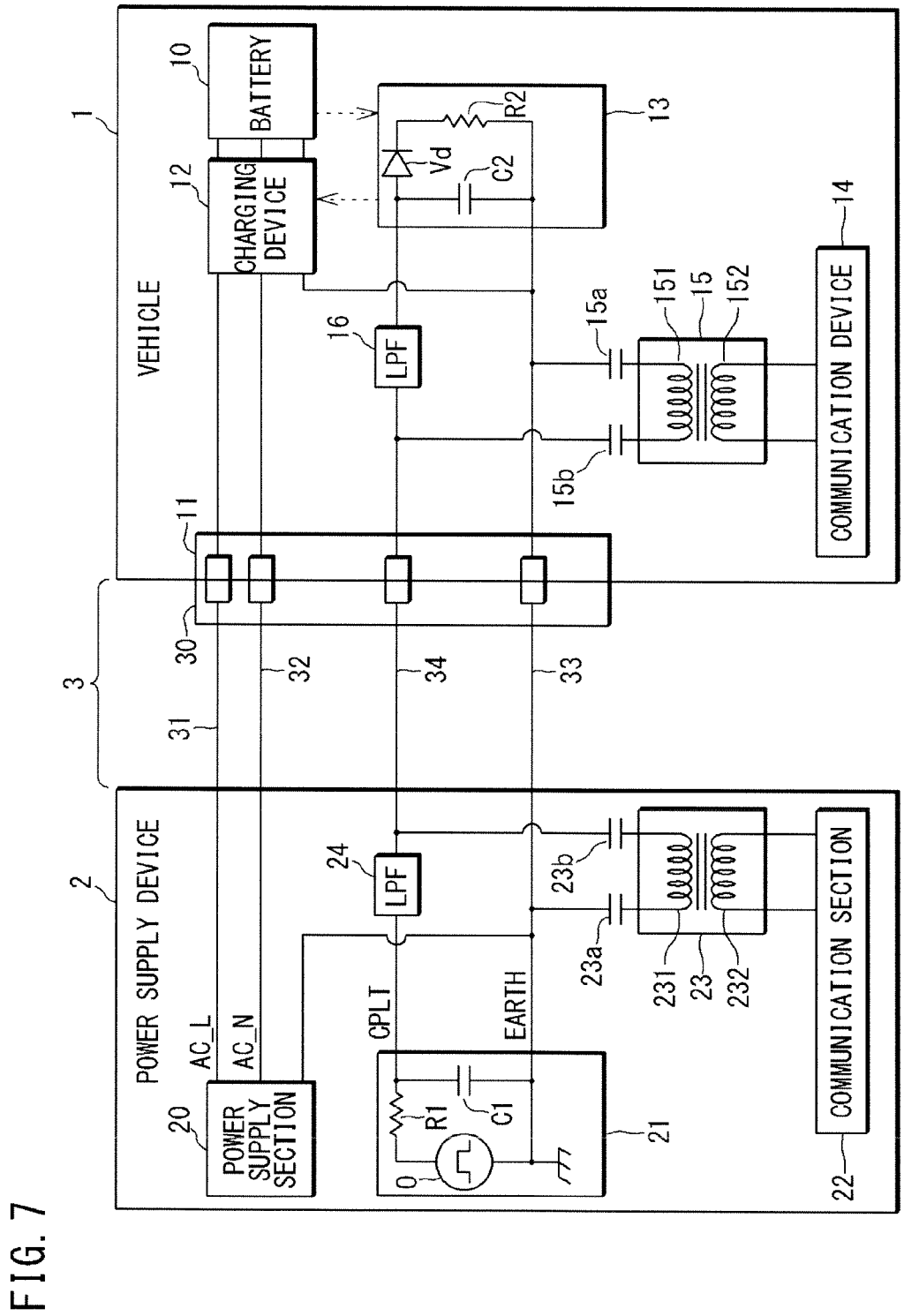
FIG. 7 is an illustrative diagram showing an example of a configuration of a communication system according to the present invention.

FIG. 7 is an illustrative diagram showing an exemplary configuration of the communication system according to the present invention. FIG. 7 shows still another exemplary configuration of the configuration of the communication system of the present invention described with reference to FIG. 1. In FIG. 7, since the same components as those shown in FIG. 1 are denoted by the same reference numerals as those shown in FIG. 1, the description for FIG. 1 should be referred to for those components. In the exemplary configuration shown in FIG. 7, a low-pass filter (LPF) 16, as separation means for separating a control signal and a communication signal, is interposed in the internal line of the vehicle 1, which is connected to the control line 34. The low-pass filter 16 is provided, in the internal line, between the branch point of the line and the charging control device 13. The low-pass filter 16 transmits signals in frequency bands lower than a predetermined frequency, e.g., a signal in a frequency band used for the control signal, and blocks the communication signal.

Further, also in the power supply device 2, a similar low-pass filter 24 is interposed in the internal line connected to the control line 34. In the power supply device 2, the low-pass filter 24 is provided, in the internal line, between the branch point of the line and the charging control section 21.

Figure 8:
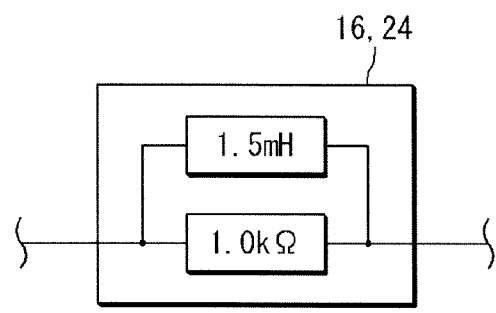
FIG. 8 is a circuit diagram showing an exemplary configuration of a low-pass filter used in the communication system according to the present invention.
Figure 9:
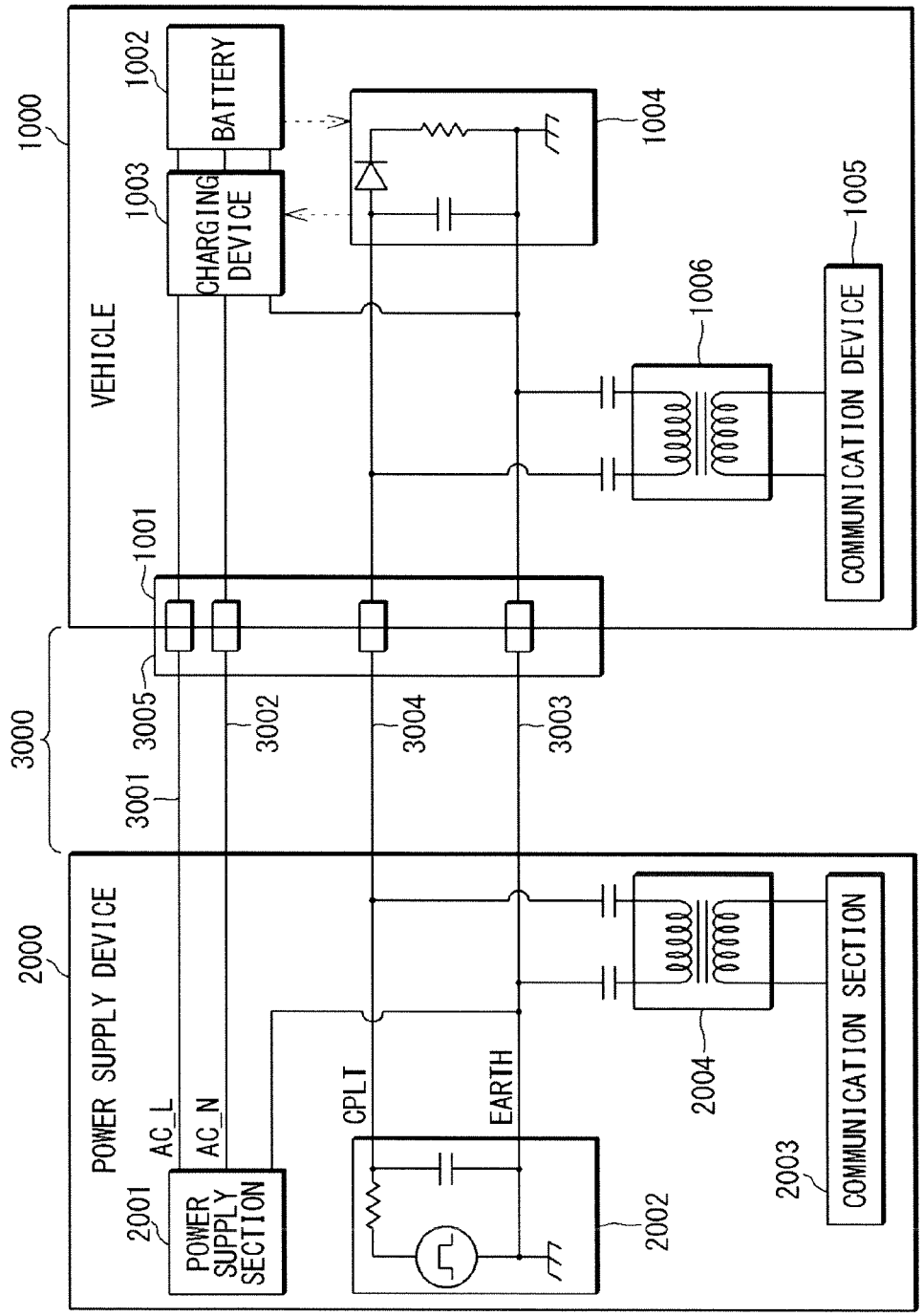
FIG. 9 is an illustrative diagram showing an exemplary configuration of a system, standardization of which is in progress.
Figure 10:
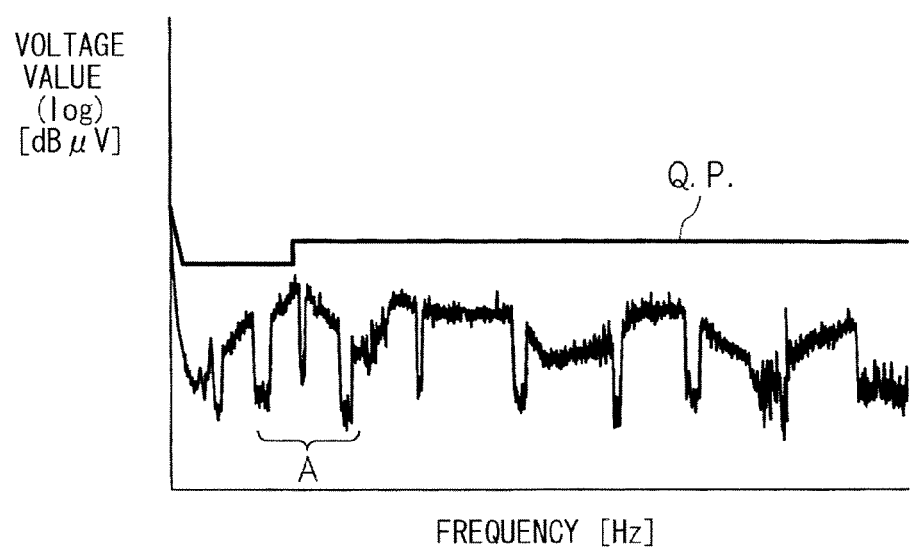
FIG. 10 is a graph showing noise that crosstalks from a communication line to a power supply line.

FIG. 8 is a circuit diagram showing an exemplary configuration of the low-pass filter 16 or 24 used in the communication system of the present invention. As shown in FIG. 8, the low-pass filter 16 or 24 is configured as, for example, a circuit in which a coil having an inductance of 1.5 mH and a resistor of 1.0 kΩ are disposed in parallel, or an equivalent circuit thereof. The low-pass filter may be configured by using any other circuit as long as the same performance can be achieved. The values of the elements used in the low-pass filter are examples, and those elements of other values may be used. In addition, the low-pass filters 16 and 24 may be provided in the exemplary configuration shown in FIG. 6. Even when the low-pass filters 16 and 24 are interposed as shown in FIGS. 7 and 8, the same effect can be achieved by adjusting the amplitude for each frequency as described above.

Figure 11:
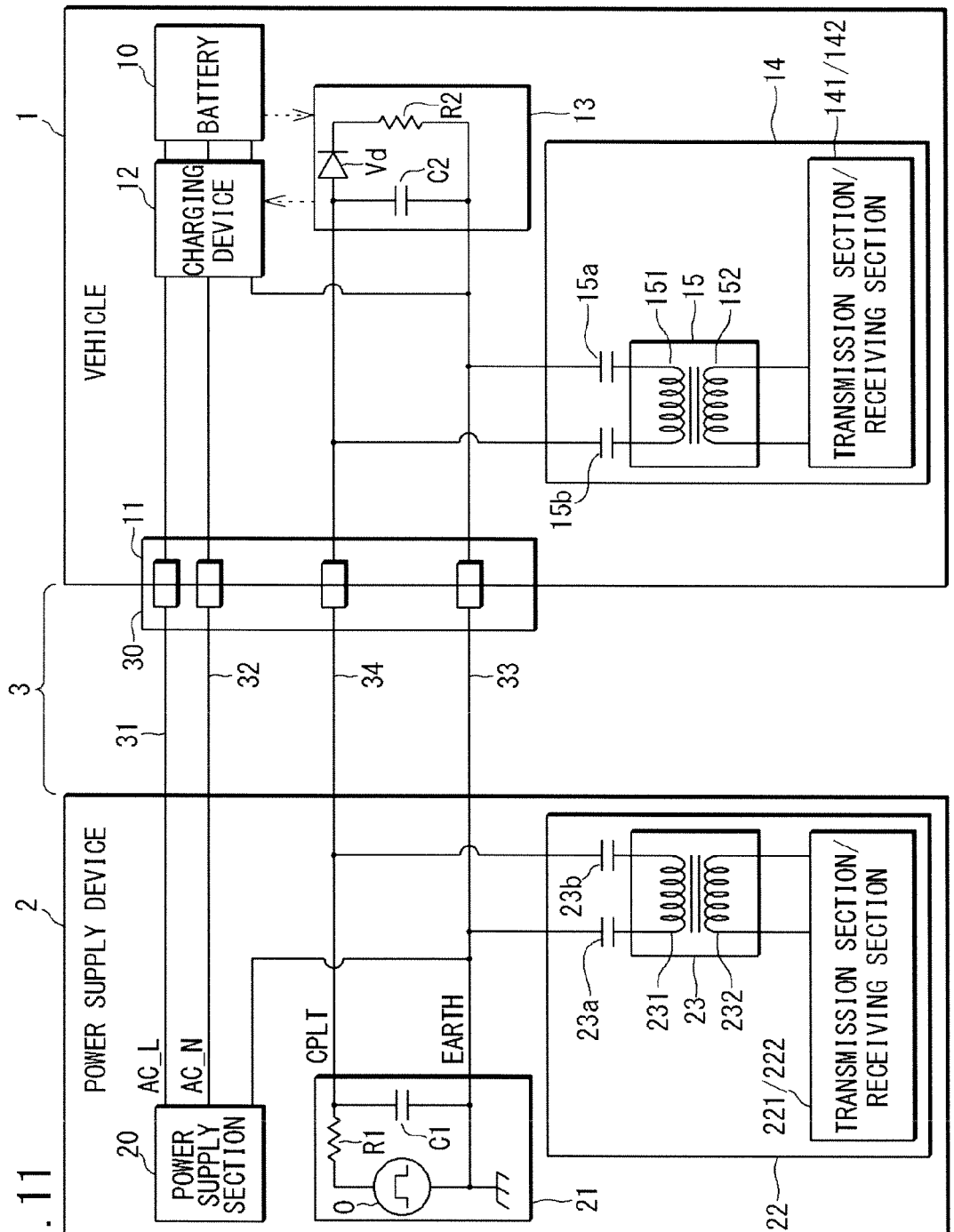
FIG. 11 is an illustrative diagram showing a modification of the communication system.
Figure 12:
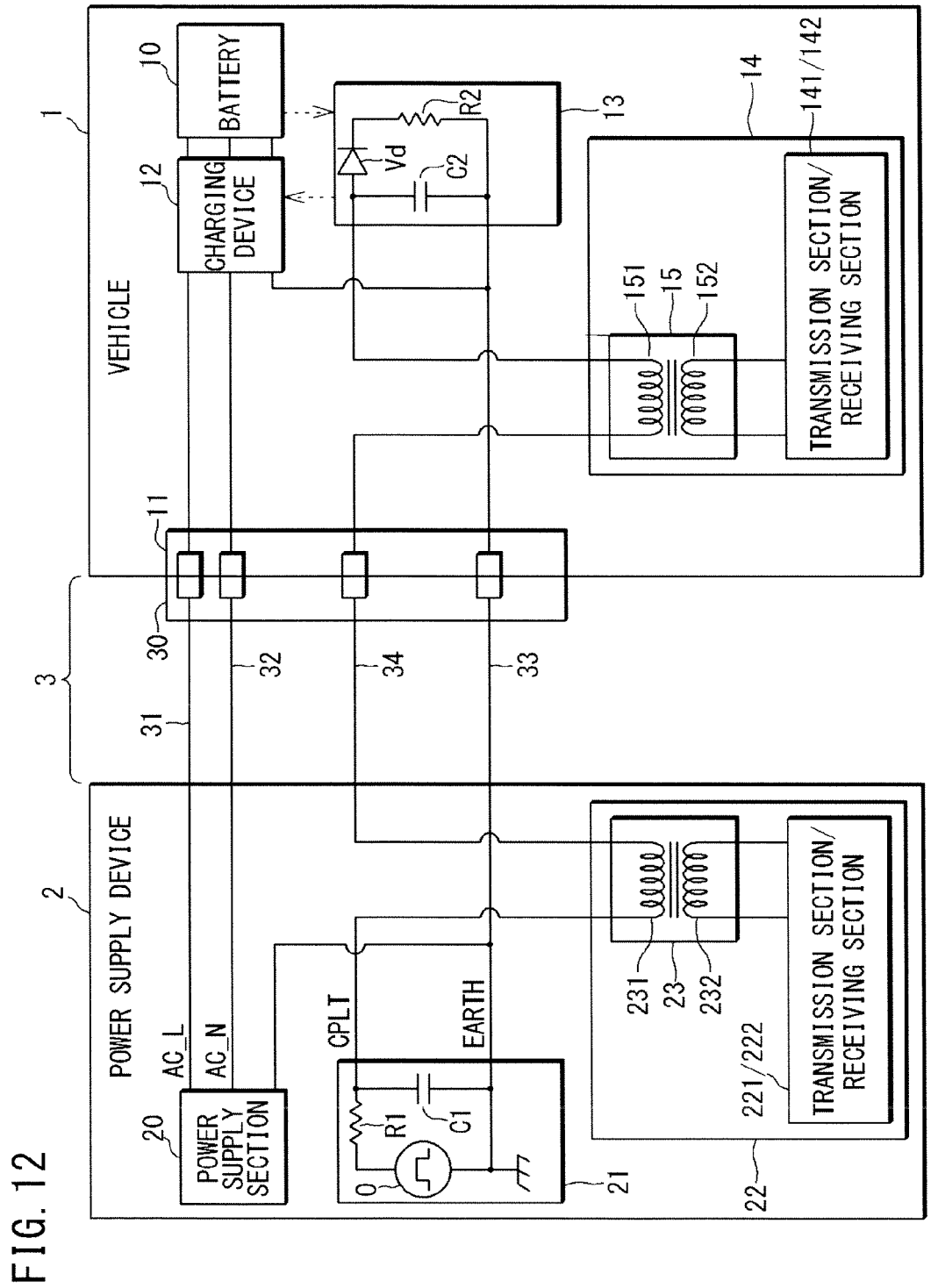
FIG. 12 is an illustrative diagram showing a modification of the communication system.
Figure 13:
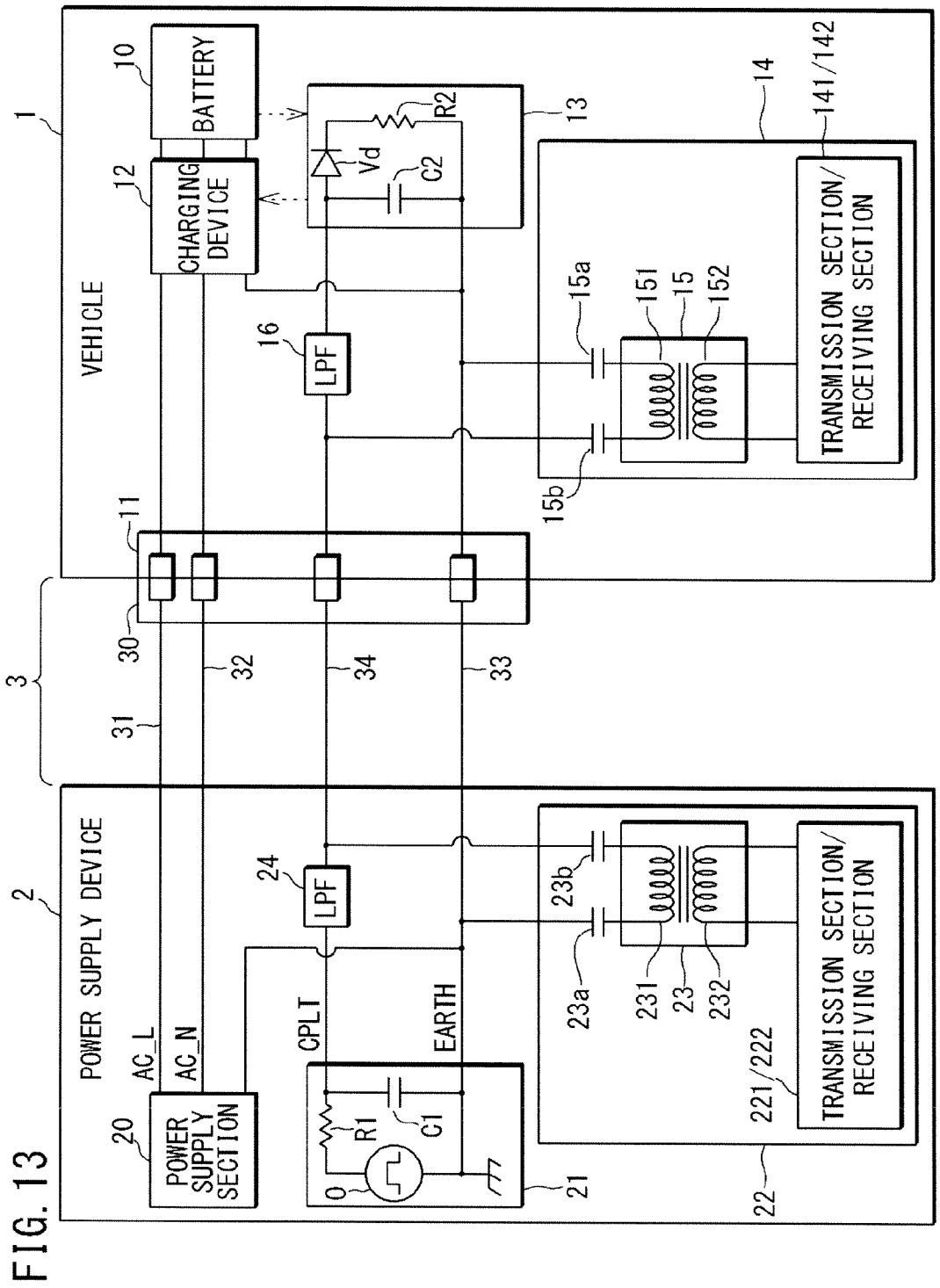
FIG. 13 is an illustrative diagram showing a modification of the communication system.

In the communication systems shown in FIGS. 1, 6 and 7, the coupling capacitors 23a and 23b and the superposition/separation section 23 are provided outside the communication section 22, and the coupling capacitors 15a and 15b and the superposition/separation unit 15 are provided outside the communication device 14. However, as shown in FIGS. 11 to 13, these components may be provided inside the communication section 22 and the communication device 14, respectively. Although not illustrated, the low-pass filters 24 and 16 may also be provided inside the communication section 22 and the communication device 14, respectively. In addition, the coupling capacitors 23a and 23b, the superposition/separation section 23, and the low-pass filter 24 may be integrated with the plug 30, and the coupling capacitors 15a, and 15b, the superposition/separation unit 15, and the low-pass filter 16 may be integrated with the power receiving connector 11. Although in the present embodiment the superposing method is unified, the superposing method may be varied. Further, although in the present embodiment the grounding line 33 is provided, grounding may be performed by using the body earth of the vehicle or a casing of the power supply device.

The setting of the output for each frequency (the setting of the crosstalk characteristics) to be stored in the memory 221b or 141b may have already been stored at the time of shipping of the power supply device 2 or the vehicle 1, or may be stored after shipping. For example, the setting of the output for each frequency (the setting of the crosstalk characteristics) to be stored in the memory 141h of the communication device 14 of the vehicle 1 may be performed when the vehicle 1 is charged by the power supply device 1, based on information obtained from the power supply device 1 in advance of charging. The crosstalk characteristics may vary depending on the line capacity or the characteristic impedance of the charging cable 3 provided in the power supply device 2. In this case, the communication device 14 of the vehicle 1 can appropriately set the magnitude of the output for each frequency by obtaining information relating to the crosstalk characteristics from the communication section 22 of the power supply device 2.

The information relating to the crosstalk characteristics obtained from the power supply device 2 is not necessarily the crosstalk characteristics, but may be the values of the line capacitance and the characteristic impedance of the charging cable 3.

Further, the communication device 14 of the vehicle 1 may store therein the value of the amplitude for each frequency, which has been adjusted based on a combination of the characteristic impedance and the line capacitance of the charging cable 3, and may read the stored value in accordance with the information transmitted from the power supply device 2 side.

Moreover, the configuration of the communication system of the present invention can be applied to various systems. For example, the configuration of the communication system can be applied not only to the inband communication but also to other communications such as PLC communication for transmitting a communication signal using a power supply line as a medium. Thus, various applications are expected.

REFERENCE SIGNS LIST 1 vehicle
10 battery (power storage device)
11 power receiving connector
12 charging device
13 charging control device
14 communication device
141 transmission section
141a transmission control circuit
141b memory
141c MAC/PHY interface
141d D/A conversion circuit
141e AFE
142 receiving section
142a receiving control circuit
142b AFE
142c A/D conversion circuit
142d MAC/PHY interface
15 superposition/separation unit
15a, 15b coupling capacitor
151 primary coil
152 secondary coil
16 low-pass filter
2 power supply device
20 power supply section
21 charging control section
22 communication section
221 transmission section
221a transmission control circuit
221b memory 221c MAC/PHY interface
221d D/A conversion circuit
221e AFE
222 receiving section
222a receiving control circuit
222b AFE
222c A/D conversion circuit
222d MAC/PHY interface
23 superposition/separation section
23a, 23b coupling capacitor
231 primary coil
232 secondary coil
24 low-pass filter
3 charging cable
30 plug
31, 32 power supply line
33 grounding line
34 control line

The invention claimed is:

1. A communication system in which a vehicle including a power storage device and a power supply device that supplies power to the power storage device are connected to each other via a power supply line used for power supply and a control line for transmitting a control signal required for control of the power supply using the power supply line, and a communication signal different from the control signal is transmitted and received using the control line as a medium, wherein
at least one of the vehicle and the power supply device includes a transmission section that transmits the communication signal, and
the transmission section includes adjustment means that adjusts an output waveform relating to the transmission of the communication signal to an amplitude previously set for each frequency.

2. The communication system according to claim 1, wherein
the transmission section further includes storage means in which setting relating to an output for each frequency is previously stored, and
the adjustment means
adjusts the communication signal by means of data on a frequency domain indicating an amplitude for each frequency, based on the setting for each frequency stored in the storage means, and
converts the communication signal as the data on the frequency domain into data on a time domain.

3. The communication system according to claim 1 wherein the adjustment means is configured to adjust the communication signal by orthogonal frequency-division multiplexing.

4. The communication system according to claim 1, wherein the setting of the amplitude for each frequency is determined based on crosstalk characteristics with respect to the power supply line.

5. A communication device which is connectable to a control line for transmitting a control signal required for control of power supply using a power supply line, and transmits a communication signal different from the control signal by using the control line as a medium, and
the communication device including means that adjusts an output waveform relating to the transmission of the communication signal to an amplitude previously set for each frequency.

6. A power supply device which is connectable to an external object to be supplied with power, via a power supply line used for power supply and a control line for transmitting a control signal required for control of the power supply using the power supply line, and transmits a communication signal different from the control signal by using the control line as a medium, and
the power supply device including means that adjusts an output waveform relating to the transmission of the communication signal to an amplitude previously set for each frequency.

7. A vehicle which includes a power storage device, is connectable to an external power supply device that supplies power to the power storage device, via a power supply line used for power supply and a control line for transmitting a control signal required for control of the power supply using the power supply line, and further includes a communication device that transmits a communication signal different from the control signal by using the control line as a medium, wherein
the communication device includes means that adjusts an output waveform relating to transmission of the communication signal to an amplitude previously set for each frequency.

* * * * *